US008942421B1

(12) United States Patent
Virgilio

(10) Patent No.: US 8,942,421 B1
(45) Date of Patent: Jan. 27, 2015

(54) GEOLOCATION OF REMOTELY SENSED PIXELS BY INTROSPECTIVE LANDMARKING

(71) Applicant: Exelis, Inc., McLean, VA (US)

(72) Inventor: Vincent Nicholas Virgilio, Fort Wayne, IN (US)

(73) Assignee: Exelis, Inc., McLean, VA (US)

( * ) Notice: Subject to any disclaimer, the term of this patent is extended or adjusted under 35 U.S.C. 154(b) by 51 days.

(21) Appl. No.: 13/670,974

(22) Filed: Nov. 7, 2012

(51) Int. Cl.
*G06K 9/00* (2006.01)
*G06K 9/46* (2006.01)

(52) U.S. Cl.
CPC .......................................... *G06K 9/46* (2013.01)
USPC .......................................................... 382/103

(58) Field of Classification Search
None
See application file for complete search history.

(56) References Cited

U.S. PATENT DOCUMENTS

| 5,051,751 | A | | 9/1991 | Gray | |
|---|---|---|---|---|---|
| 5,798,942 | A | * | 8/1998 | Danchick et al. | 342/96 |
| 5,852,792 | A | * | 12/1998 | Nielson | 701/518 |
| 6,011,505 | A | * | 1/2000 | Poehler et al. | 342/25 C |
| 6,023,291 | A | * | 2/2000 | Kamel et al. | 348/147 |
| 6,084,989 | A | * | 7/2000 | Eppler | 382/293 |
| 6,810,153 | B2 | * | 10/2004 | Komura et al. | 382/295 |
| 6,898,518 | B2 | * | 5/2005 | Padmanabhan | 701/409 |
| 6,954,551 | B2 | * | 10/2005 | Weismuller | 382/209 |
| 7,653,235 | B2 | | 1/2010 | Mylaraswamy et al. | |
| 8,121,433 | B2 | * | 2/2012 | Leprince et al. | 382/294 |
| 8,406,513 | B2 | * | 3/2013 | Chien | 382/154 |
| 8,532,328 | B2 | * | 9/2013 | Caballero et al. | 382/100 |
| 2007/0218931 | A1 | * | 9/2007 | Beadle et al. | 455/502 |
| 2009/0265104 | A1 | * | 10/2009 | Shroff | 701/216 |
| 2011/0187590 | A1 | * | 8/2011 | Leandro | 342/357.27 |

OTHER PUBLICATIONS

Aminou, D. M., Lamarre, D., Stark, H., Braembussche, P. V., Blythe, P., Fowler, G., et al. (2009), Meteosat Third Generation (MTG) Status of the Space Segment definition. In R. Meynart, S. P. Neeck, & H. Shimoda (Ed.), Sensors, Systems, and Next-Generation Satellites XIII. 7474. SPIE.
Aminou, D. M., Stark, H., Schumann, W., Fowler, G., Gigli, S., Stuhlmann, R., et al, (c. 2007). Meteosat Third Generation: Progress on Space Segment System Feasibility Studies: Payload Aspects.

(Continued)

*Primary Examiner* — Shervin Nakhjavan
(74) *Attorney, Agent, or Firm* — RatnerPrestia

(57) ABSTRACT

A method of geodetically locating pixels of a captured image of a planetary body comprises the steps of: detecting an object on the planetary body using an imaging sensor viewing the planetary body; matching the object to a predetermined landmark on the planetary body; and updating, at a time $t_k$, a state vector representing kinematics of the imaging sensor, and $t_k$ representing a present update time. Updating the state vector at the present time occurs if, and only if, the matching step is successful. In addition, the method includes computing a line-of-sight (LOS) vector from the imaging sensor to the planetary body, based on observations of the planetary body and the kinematics of the state vector; and geodetically locating the pixels of the captured image, based on the LOS vector. The LOS vector is based only on (a) the predetermined landmark and (b) a position command from a ground processing segment to the imaging sensor.

18 Claims, 10 Drawing Sheets

(56) References Cited

OTHER PUBLICATIONS

Barton, J., Bass, J., & Milnes, M. (2004). MTSAT Image Data Acquisition and Control System. *13th Conference on Satellite Meteorology and Oceanography*. American Meteorological Society.

Blancke, B., Carr, J. L, Pomport, F., Rombaut, D., Pourcelot, B., & Mangolini, M. (1997). The MSG Image Quality Ground Support Equipment. *Proceedings of the 1997 EUMETSAT Meteorological* (pp. 581-585). Darmstadt: EUMETSAT.

Brush, R. J. (1988). The navigation of AVHRR imagery. *International Journal of Remote Sensing*, 9(9), 1491-1502.

Bryant, J. W., Ashton, S., Comeyne III, G., & Ditillo, D. A. (1996). GOES Image Navigation and Registration On-Orbit Performance. *SPIE*, 2812, 805-821.

Carr, J. L. (2009). Twenty-five Years of INR. *The Journal of the Astronautical Sciences*, 57, 505515.

Carr, J. L, & Madani, H. (c. 2004). Measuring Image Navigation and Registration Performance at the 3-\sigma Level Using Platinum Quality Landmarks.

Carr, J. L., Mangolini, M., Pourcelot, B., & Baucom, A. W. (1997). Automated and Robust Image Geometry Measurement Techniques with Application to Meteorological Satellite Imaging. *Image Registration Workshop Proceedings* (pp. 89-100). NASA.

Kamel, A. A., McLaren, M. D., Sheffield, J., & Faller, K. H. (c. 2006), Parametric Error Correction for Imaging Systems.

Katamanov, S. N. (n. d.). Automatic Navigation of One Pixel Accuracy for Meteorological Satellite Imagery. 269-274.

Kinter, H., Just, D., & Mullet, B. (c. 2011). Meteosat Third Generation Navigation Approach. 22nd International Symposium on Space Flight Dynamics. Brasil: Instituto Nacional de Pesquisas Espaciais.

Kramer, H. J. (n.d.). GMS (Geostationary Meteorological Satellite). Retrieved 2012, from http://www.eoportal.org/directory/pres_GMSGeostationaryMeteorologicalSatellite.html.

Kramer, H. J. (n.d.). MTSAT (Multifunction Transport Satellite). Retrieved 2012, from http://www.eoportal.org/directory/pres_MTSATMultifunctionTransportSatellite.html.

Le Moigne, J., Carr, J., Chu, D., & Esper, J. (1999). Advanced Geosynchronous Studies Imager (AGSI): Image Navigation and Registration (INR) System. SPIE Conference on Earth Observing Systems IV. 3750, pp. 23-34. Denver: SPIE.

Lee, B.-S., Hwang, Y., Kim, H.-Y., & Kim, B.-Y. (> Jul. 4, 2010). Operational Validation of the Flight Dynamics System for COMS Satellite.

Madani, H., & Carr, J. L. (2004). Image Registration Using AutoLandmark. 3778-3781.

Raol, J. R., & Sinha, N. K. (1985). On the Orbit Determination Problem. IEEE transactions on aerospace and electronic systems, AES-21 (3), 274-291.

Schmetz, J., Pili, P., Tjemkes, S., Just, D., Kerkmann, J., Rota, S., et al. (Jul. 2002). An Introduction to METEOSAT Second Generation (MSG). BAMS, pp. 977-992.

Shim, J.-M, (2006-2008). Korea Geostationary Satellite Program: Communication, Ocean, and Meteorological Satellite (COMS). Image Navigation and Registration. In GOES I-M DataBook (pp. 82-89).

Wertz, J. R. (2000). Spacecraft Attitude Determination and Control. Torrance, CA: Kluwer Academic Publishers, p. 513.

Carson, C., Carr, J. L., & Sayal, C. (c. 2006). GOES-13 End-to-End INR Performance Verification and Post-launch Testing.

Dlekmann, F. J. (1994). Overview on METEOSAT Geometrical Image Data Processing. *Third International Symposium on Space Mission* (pp. 85-93). NASA.

Eastman, R. D., Le Molgne, J., & Netanyahu, N. S. (2007). Research issues in image registration for remote sensing. *IEEE Conference on Computer Vision and Pattern Recognition*, 3233-3240.

Emery, W, J., Brown, J., & Nowak, Z. P, (1989). AVHRR Image Navigation: Summary and Review. *Photogrammetric Engineering and Remote Sensing*, 55 (8), 1175-1183.

Esper, J., Bryant, W. C., Carr, J. L., & Harris, J. B. (1998), New GOES landmark selection and measurement methods for improved on-orbit image navigation and registration performance. *EUROPTO Conference on Image and Signal Processing for Remote Sensing*. 3500, pp. 10-24. Barcelona: SPIE.

Gibbs, B. (Jul./Aug. 2008). GOES Image Navigation and Registration. *SatMagazine*, pp. 3242.

Harris, J., & Just, D. (2010). INR Performance Simulations for MTG. *SpaceOps 2010 Delivering on the Dream*. Huntsville: AIAA.

Hwang, Y., Lee, B.-S., Kim, H.-Y., Kim, H., & Kim, J. (2008), Orbit Determination Accuracy Improvement for Geostationary Satellite with Single Station Antenna Tracking Data. *ETRI Journal*, 30 (6), 774-782.

Iwasaki, A., & Fujisada, H., Image Navigation and Registration. In *GOES I-M DataBook* (pp. 82-89)(2005). ASTER Geometric Performance. *IEEE Transactions on Geoscience and Remote Sensing*, 43 (12).

Kamel, A. A. (1996). GOES Image Navigation and Registration System. SPIE, 2812, 766-776.

Takeuchi, W., & Yasuoka, Y. (2007). Precise Geometric Correction of MTSAT Imagery. Asian Conference on Remote Sensing (ACRS).

Tehranian, S., Carr, J. L., Yang, S., Swaroop, A., & McKenzie, K. (n.d.). XGOHI, Extended GOES High-Inclination Mission for South-American Coverage.

U.S. Department of Commerce/NOAA/NESDIS. (1998). Earth Location User's Guide. NOAA/NESDIS.

White, R. L., Adams, M. B., Geisler, E. G., & Grant, F. D. (1975). Attitude and Orbit Estimation Using Stars and Landmarks. IEEE transactions on aerospace and electronic systems, AES-11 (2), 195-203.

Wolfe, R. E., Nishihama, M., Fleig, A. J., Kuyper, J. A., Roy, D. P., Storey, J. C., et al. (2002). Achieving sub-pixel geolocation accuracy in support of MODIS land science. Remote Sensing of Environment (83), 31-49.

\* cited by examiner

GEOLOCATION OF REMOTELY SENSED PIXELS BY INTROSPECTIVE LANDMARKING

FIELD OF THE INVENTION

The present invention relates, generally, to Kalman filtering. More specifically, the present invention relates to Kalman filtering sensor measurements which estimate geo-location of image pixels taken by a satellite observatory in a planetary orbit around Earth or another planet.

BACKGROUND OF THE INVENTION

The Kalman filter receives a series of measurements observed by a system over time, which include noise and other inaccuracies, and produces estimates of unknown variables representing the system. These variables are known as the system state which becomes more accurate and precise over time. The Kalman filter operates recursively on noisy input data and produces an optimal estimate of the system state.

The Kalman filter works in a two-step process. One step is referred to as a prediction step and the other step is referred to as an update step. The prediction step produces estimates of the current state variables of the underlying system. Once the next measurement is observed, which is corrupted by error and noise, the state variables are updated using weighted averages. More weight is given to updates having higher certainty. The Kalman filter can be executed in real time by using only the present input measurements and the previously calculated system state.

The Kalman filter is widely applied to navigation and control of vehicles, in particular aircraft and orbiting satellites. The filter aids vehicles in obtaining better estimates of geographic location, for example, latitude and longitude on the Earth. Moreover, orbiting satellites may include sensors that image the Earth to obtain panoramic views of the Earth. These images are mosaic-ed by registering one image with an adjacent image as the orbiting satellite is in continuous motion. A Kalman filter may be used to obtain knowledge of the geodetic location of a pixel in one image as it relates to the geodetic location of another pixel in an adjacent image.

Conventionally, image registration requires knowledge of the orbit and attitude of the imaging sensor. Typically, such knowledge is obtained by using range sensors and star-fixing measurements to isolate the effects of attitude and nullify the effects of orbit error. A Kalman filter is typically used in the process. A significant component of the complexity in the process is due to the range sensors and the additional computations due to the star-fixing measurements.

As will be explained, the present invention provides an improved Kalman filter that can extract position and attitude information about an imaging sensor orbiting a central body, by using only observations of the central body. No other types of scene observations or scene measurements are needed to obtain this information. As will also be explained, the present invention uses direct observations of the central body as provided in the imaging sensor's native imaging mode. No orbit determination system is required.

SUMMARY OF THE INVENTION

To meet this and other needs, and in view of its purposes, the present invention provides a method of geodetically locating pixels of a captured image of a planetary body. The method comprises the steps of: detecting an object on the planetary body using an imaging sensor viewing the planetary body; matching the object to a predetermined landmark on the planetary body; and updating, at a time $t_k$, a state vector representing kinematics of the imaging sensor, and $t_k$ representing a present update time. Updating the state vector at the present time occurs if, and only if, the matching step is successful. In addition, the method includes computing a line-of-sight (LOS) vector from the imaging sensor to the planetary body, based on observations of the planetary body and the kinematics of the state vector; and geodetically locating the pixels of the captured image, based on the LOS vector. The LOS vector is based only on (a) the predetermined landmark and (b) a position command from a ground processing segment to the imaging sensor.

Detecting and matching the object to the predetermined landmark includes collecting an image from the imaging sensor of the detected object, predicting an image of the detected object, and correlating the collected image with the predicted image. The correlating step includes: finding a peak value resulting from correlating the collected image with the predicted image, determining if the peak value is above a predetermined threshold value, and flagging the matching step as successful, if the peak value is above the predetermined threshold value.

Updating the state vector includes: determining an offset vector between the collected image and the predicted image, multiplying the offset vector by a Kalman gain, at the present update time, to obtain a state increment; and updating the state vector using the state increment.

The state vector includes the following parameters:
attitude parameters of the imaging sensor,
orthogonality of the imaging sensor, and
orbit parameters of the imaging sensor.

The attitude parameters include roll, pitch and yaw, representing a combined attitude of an orbiting platform and the imaging sensor disposed in the platform. The attitude parameters are in a fixed grid reference frame (FGF). The orbit parameters include Kamel parameters or Kepler parameters representing an orbit's deviation from the nominal orbit.

The attitude and orthogonality parameters are used to compute the LOS is vector to a pixel in the captured image, and the orbit parameters are used to compute an orbit vector from the imaging sensor to a center of the planetary body.

The LOS vector and the orbit vector are used to compute a geodetic location of each of the pixels in the captured image, the geodetic location provided in latitude and longitude of the planetary body.

The state vector is a state vector used in a Kalman filter. The predicted observations of the planetary body are provided by an observation matrix used in the Kalman filter, and the observation matrix is parameterized by scanning angles of the imaging sensor, and a current estimate of yaw in the state vector. The observation matrix is further parameterized by an ideal curvature of the planetary body.

The scanning angles are based on nominal FGF coordinates of the predetermined landmark, during the time $t_k$, and a measured LOS in a line-of-sight reference frame (LRF), during a time greater than or equal to $t_{k-1}$ and less than $t_k$. The $t_{k-1}$ is a time of a previous state vector update, based on a successful match.

Another embodiment of the present invention is a method of assigning geodetic locations to pixels in an image taken by an imaging sensor of a planetary body. The method comprises the steps of:

(a) receiving a collected image including pixels in a neighborhood of an observed feature;

(b) forming a predicted image including pixels in a neighborhood of a predetermined landmark;

(c) flagging the collected image as likely including the predetermined landmark;

(d) calculating an offset between the predicted and collected images, at a present time of $t=t_k$;

(e) updating a state vector representing kinematics of the imaging sensor, based on the offset; and (f) assigning a geodetic location to a pixel captured by the imaging sensor, using a geodetic location of the predetermined landmark, at the present time of $t=t_k$.

Assigning a geodetic location to a pixel captured by the imaging sensor may include using an observed location based on a scanning angle of the imaging sensor, at a previous time of t greater than or equal to $t_{k-1}$ and less than $t_k$, where $t_{k-1}$ is a previous time of updating the state vector. The scanning angle of the imaging sensor is based on telemetry data from a ground station.

The method may include the steps of:

(g) performing star measurements to obtain another scanning angle of the imaging sensor, and (h) assigning a geodetic location to a pixel captured by the imaging sensor includes using the other scanning angle based on the star measurements.

The geodetic location of the pixel is assigned using only (i) the observed location and (ii) the predetermined landmark, and the geodetic location of the pixel is not assigned using star measurements.

Yet another embodiment of the present invention is a processing system for executing the following steps:

(a) estimating a geodetic location of a pixel in an image, wherein the image is viewed from an orbiting imaging sensor;

(b) forming a predicted image based on the estimated geodetic location of the pixel;

(c) receiving a collected image including a predetermined landmark;

(d) updating a state vector in a Kalman filter based on an offset between (a) the predicted image and (b) the collected image; and (e) determining a better geodetic location of the pixel in the image using the updated state vector.

The state vector is updated based on the predetermined landmark, and not updated based on star measurements.

It is understood that the foregoing general description and the following detailed description are exemplary, but are not restrictive, of the invention.

BRIEF DESCRIPTION OF THE FIGURES

The invention may be understood from the following detailed description when read in connection with the accompanying figures.

DETAILED DESCRIPTION OF THE INVENTION

Geo-location of an image pixel assigns a location on the Earth to an image pixel, which is remotely sensed from a satellite observatory in a planetary orbit, around the Earth or another planetary body. Typically, pixels of an image are acquired in a sensor's field-of-view (FOV), which scans over a field-of-regard (FOR). Once the pixels are assigned to corresponding locations on the Earth, the pixels may be arranged into a mosaic to form a collected image of all or part of the FOR. The remote sensing system may include an imaging sensor with multiple channels, as shown in FIG. 1.

The satellite carries the imaging sensor in orbit around the Earth (for example). As the sensor orbits the Earth, it may collect light from the Earth and stars. The imaging sensor's perspective changes with orbit and with the movement of one or more moveable mirrors within the sensor's optics. The mirrors are collectively referred to herein as a scanner. The mirrors are typically moved by servo mechanisms that are commanded by control signals generated in a ground control segment and/or an on board computer processing system.

Figure 1:
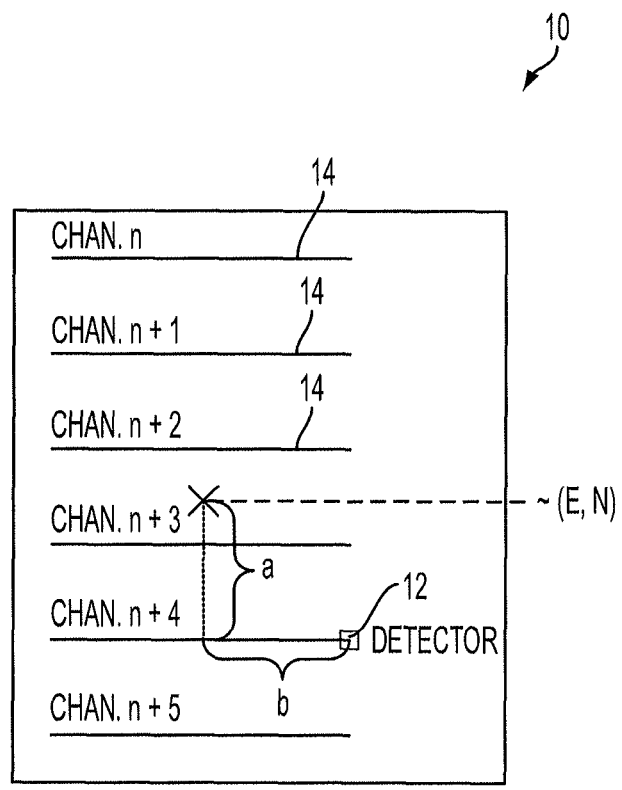
FIG. 1 is an example of multiple channels in an imaging sensor. A detector is shown in one channel which has an extended field-of-view (FOV) in a coordinate (a, b) relative to the scanner's line-of-sight (LOS) of (E, N).

Referring first to FIG. 1, the line-of-sight (LOS) of the scanner in its native reference system (frame) is denoted as (East, North), or (E, N). As shown, imaging sensor 10 includes multiple channels 14, six of which are shown designated as n through n+5. Each channel 14, which may be tuned to a narrow spectral range, includes a vertical (North-South) stack of detectors that scans the Earth. Only one detector is shown in FIG. 1, as detector 12.

Some imaging sensors have a short stack of detectors and, thus, are adequately described by the scanner's LOS, namely (E, N). Other imaging sensors have taller stacks of detectors 12 which require an explicit coordinate added to (E, N) Such imaging sensors have extended FOVs and require each detector's coordinate relative to the scanner's LOS (E, N). The extended FOV is denoted by (a, b), as shown in FIG. 1. The "a" is an East-West offset corresponding to a spectral channel; the "b" is a North-South offset corresponding to a detector's position in the stack of detectors. It will be appreciated that channels in extended FOVs do not simultaneously sense the same point on the Earth. They sense a specific point at a time that is determined by their offset from the scanner's LOS (E, N) and the scanning rate.

Figure 2:
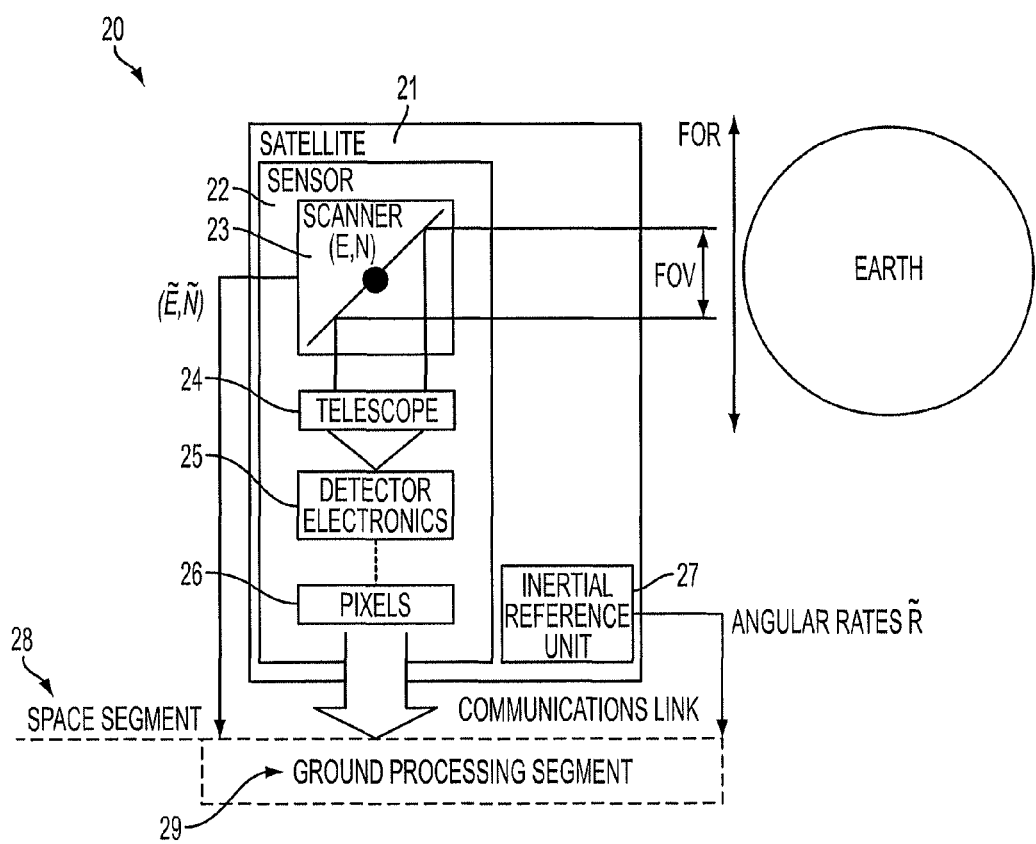
FIG. 2 is a block diagram of a space segment having a field-of-view (FOV) for imaging the Earth, or another planetary body. The space segment provides pixel intensities detected by an imaging sensor disposed in the space segment, while viewing the planetary body. The pixel data, along with telemetry data, are sent to a ground processing segment for processing the data, in accordance with an embodiment of the present invention.

Referring next to FIG. 2, remote sensing system 20 consists of a space segment and a ground segment. The space segment, designated as 28, communicates with the ground segment, designated as 29. As shown, space segment 28 includes an imaging sensor 22 which is disposed in a satellite 21. The imaging sensor has a predetermined FOV of the Earth and an FOR controlled by scanner 23. The imaging sensor 23 also includes telescope 24, detector electronics 25 and at least one pixel array 26. The pixel array, it will be understood, may be any sized FPA of detectors having n×m rows and columns, respectively. Light reflected by the scan mirrors of scanner 23 is directed through the sensor's telescope. The telescope 24 focuses this light onto the one or more FPAs 26. Each FPA includes one or more arrays of light-sensitive detectors; each array of detectors may include a different spectral channel, which is usually physically displaced from another spectral channel.

The detectors accumulate the light incident on them for a very short time and at regular intervals. Each detector's accumulation produces a detector sample, or pixel. Each channel's pixels are periodically grouped and sent as a message to the ground processing segment 29. The pixel values are referred to as science data. Mirror position measurements are also periodically sent to the ground processing segment by imaging sensor 22. Additionally, the satellite 21 periodically sends measurements of its attitude (A) and attitude rate (R) to the ground. These measurements are referred to as telemetry. Telemetries include auxiliary data which enables ground processing to assign a geographic position (for example, latitude and longitude) to each of the collected pixels.

Figure 3:
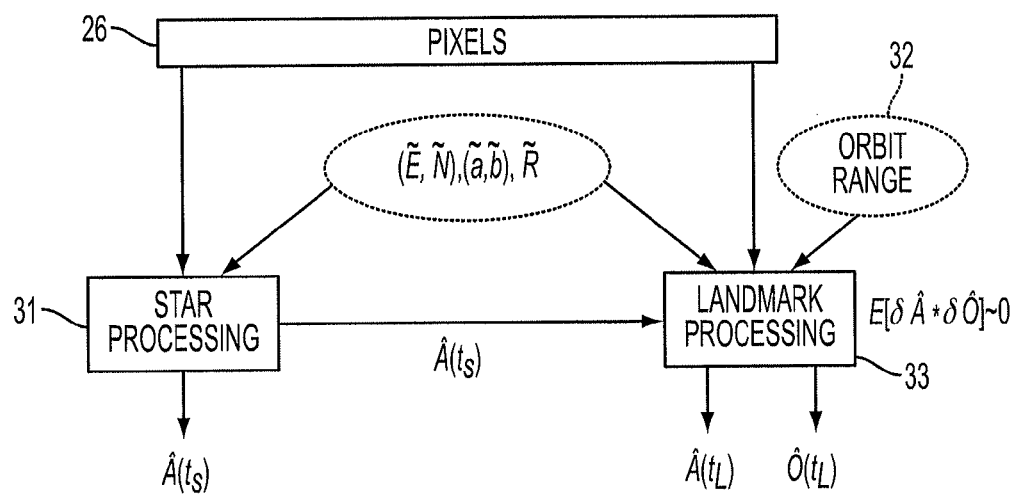
FIG. 3 is a block diagram of a portion of the ground processing segment that analyzes collected pixels of images to extract pointing and location knowledge of the imaging system. The block diagram includes star processing to obtain attitude knowledge of the imaging system and orbit ranging to obtain orbit knowledge of the imaging system.

The ground processing segment 29 arranges the collected pixels into images. It analyzes the telemetry and/or image features to extract pointing and location knowledge of the system. A portion of the images contain features necessary for knowledge determination. These images may be obtained from landmark and star observations. Referring now to FIG. 3, there is shown star processing 31 and landmark processing 33, which are performed by the ground processing segment on the pixels received from the space segment. Also included in FIG. 3 is an orbit ranging system, designated as 32. It will be appreciated that orbit ranging system 32 is optional and typically is not included as part of the present invention.

Landmark observations carry information that is influenced by the orbital position O(t) of the spacecraft relative to Earth. Those observations also carry information that is influenced by the attitude of the spacecraft and sensor relative to the stars or inertial space. Star observations carry information that is only influenced by the inertial attitude A(t) of the spacecraft. The attitude from the star observations is used to separate the combined effect of orbit and attitude in the landmark observations. The expected errors $E[\delta \hat{A}]$ and $E[\delta \hat{O}]$ in the estimated attitude and orbit, respectively, of the spacecraft are largely independent of each other, and when multiplied together approximate zero. As shown in FIG. 3, $A(t_S)$ denotes an attitude vector obtained from star processing, $A(t_L)$ denotes an attitude vector obtained from landmark processing, and $O(t_L)$ denotes an orbit vector obtained from landmark processing. It will be understood, as will be explained later, that star processing 31 is optional and typically is not performed as part of the present invention.

Figure 4:
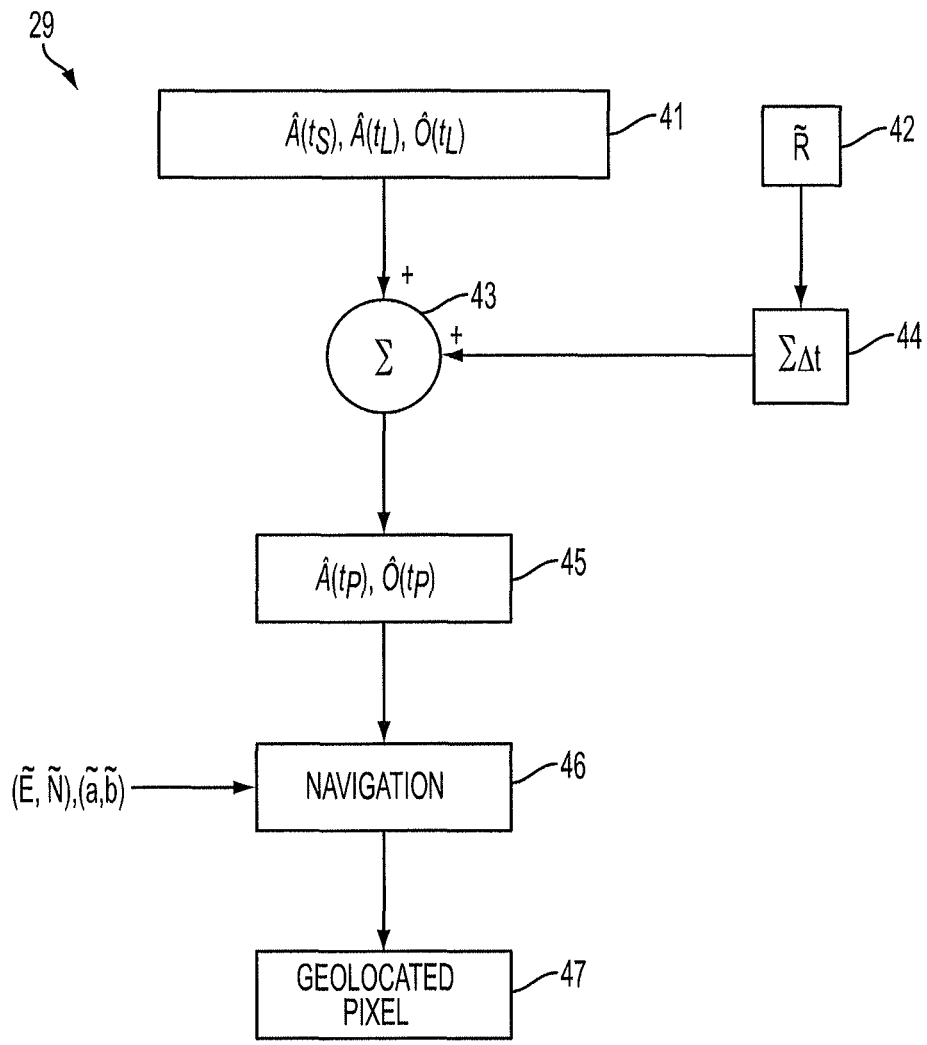
FIG. 4 is a block diagram showing ground processing combining (a) attitude and orbit information extracted from landmark and star observations with (b) spacecraft rate telemetry to provide a complete description of the imaging system at the collection time of each pixel.

Referring next to FIG. 4, there is shown a portion of ground processing segment 29, which receives the attitude and orbit information extracted from landmark and star observations, the information generally designated as 41. In addition, spacecraft rate telemetry (R) 42 is received in order to provide a complete description of the imaging system at the collection time of each pixels. An integrator 44 integrates the spacecraft rate telemetry to obtain angular attitude of the spacecraft as a function of time. The attitude vector and orbit vector of each pixel are obtained through summing module 43, thereby providing a pixel attitude vector $A(t_P)$, and an orbit vector $O(t_P)$ as a function of time, by way of module 45.

The ground processing segment 29 also includes navigation algorithms 46 for processing the system's knowledge with standard geometry between the imaging sensor and Earth in order to obtain each pixel's latitude and longitude on the Earth, by way of module 47. The standard geometry is parameterized by scan angles $(\tilde{E}, \tilde{N})$ and detector coordinates $(\tilde{a}, \tilde{b})$. This process is referred to as navigation or geo-location.

Geo-location performance is assessed in terms of navigation and registration errors. Each geo-located pixel has an associated accuracy called the navigation error. The difference between a pair of navigation errors is called registration error. It will be appreciated that the attitude and orbit errors referred to above in connection with FIG. 3 are significant contributors to the navigation error. Because the attitude and orbit errors are independent of each other, an increase in one or both implies a similar increase in the navigation error.

A registration error, on the other hand, may be much smaller than its component navigation errors when there is a common source to the navigation errors. In such case, the common part of the errors cancels in the computation of the registration error.

It will be understood that the geo-location process shown in FIG. 4 applies not only to Earth, but to any ellipsoidal central body remotely sensed by an observatory using a remote sensing system.

Figure 5:
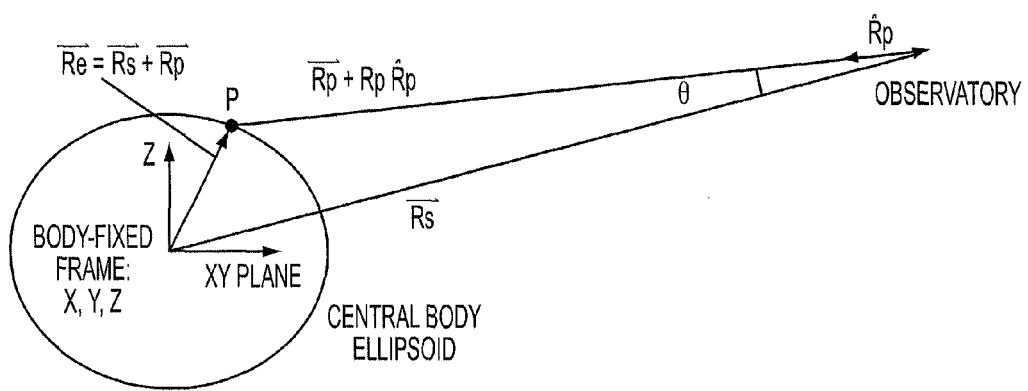
FIG. 5 shows the geometry of a remotely sensed central body ellipsoid, such as the Earth, having an estimated location of point P (or imaging pixel P) for a particular orbit ($\vec{Rs}$) and LOS ($\vec{Rp}$).

FIG. 5 shows a standard geometry of a remotely sensed central body ellipsoid, such as the Earth. The navigation algorithm described above relies on this standard geometry. As shown, it is desired to obtain accurate knowledge of the location of point P on the Earth (which is also a point P of a pixel), given some knowledge of orbit and line-of-sight (LOS) through various measurements and estimates. The orbit position vector is $\vec{Rs}$. The pixel LOS is unit vector $\widehat{Rp}$. The extension of LOS vector $\widehat{Rp}$ along its direction intersects the central body ellipsoid at point P. The distance, or slant range from the observatory (the imaging sensor) to point P is Rp. The vector from the ellipsoid center to point P is ellipsoid vector $\vec{Re}$. The ellipsoid is flattened by a small factor along the Z axis. The ellipsoid, of course, is circular at the equator (XY plane).

Figure 6:
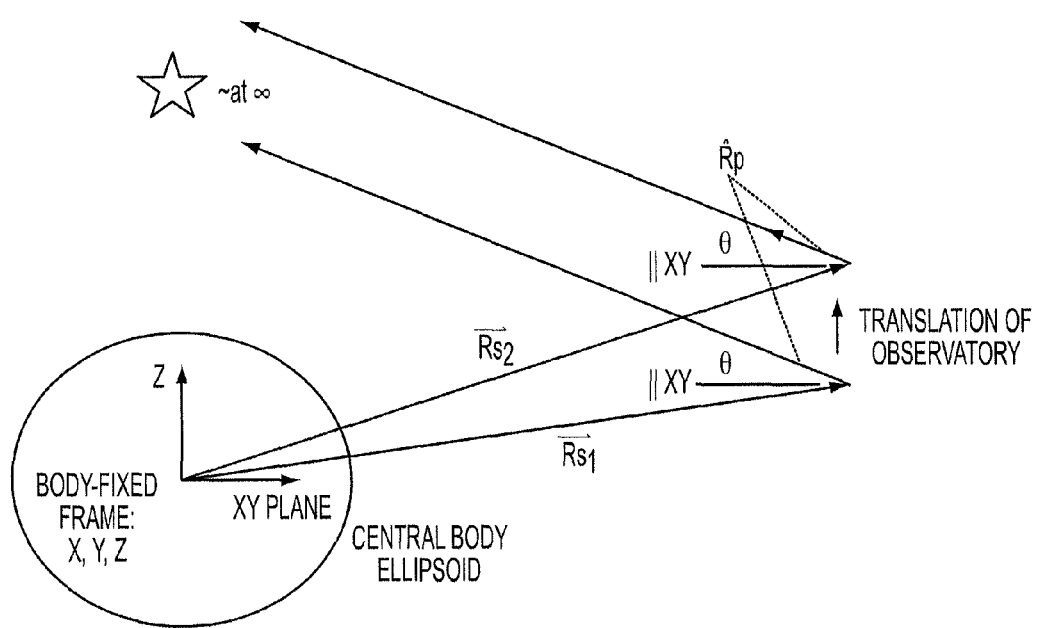
FIG. 6 shows the geometry of a remotely sensed central body ellipsoid, such as the Earth, observed at two different orbital positions of $Rs_1$ and $Rs_2$, each orbital position providing the same angle and range to a remote star.

The LOS attitude vector $\widehat{Rp}$ may be derived from star measurements, as shown by the geometry in FIG. 6. Since stars are effectively at an infinite range, star measurements isolate the effects of attitude and nullify the effects of orbit. In the absence of parallax, measurement noise and environmental effects, two orbit positions $\vec{Rs}_1$ and $\vec{Rs}_2$ provide the same $\widehat{Rp}$ with respect to the same star, as shown in the figure.

Figure 7:
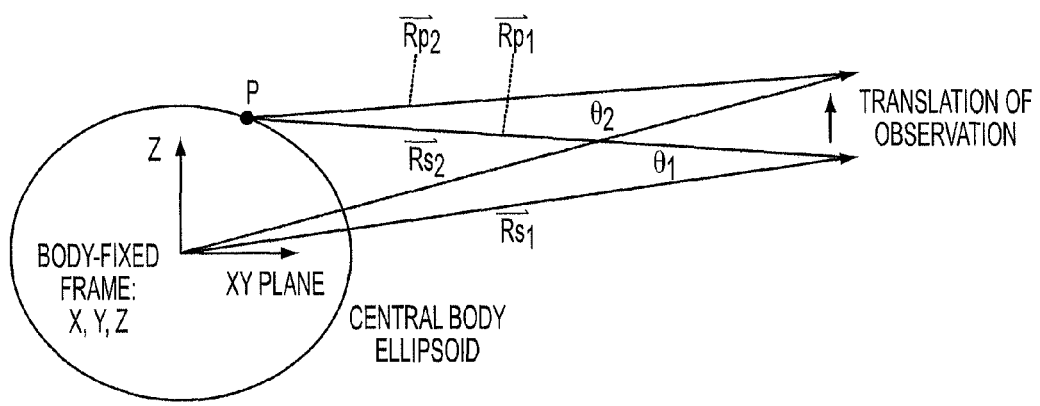
FIG. 7 shows the geometry of a remotely sensed central body ellipsoid, such as the Earth, in which the orbital effect can be computed from the parallax of the line-of-sight (LOS) to a point P on the central body.

Part of the orbit effect may be computed from the parallax of the LOS to one or more points P on the central body, as shown in FIG. 7. The computation requires orbit range measurements of $|\vec{Rs}_1|$ and $|\vec{Rs}_2|$. In order to obtain these orbit range measurements, an orbit ranging system is required, similar to orbit ranging system 32 shown in FIG. 3. As previously stated, the present invention does not require an orbit ranging system.

In general, there are several factors which limit an accurate geo-location of an image pixel. These include the following:

1. Noise in the measurement of the scanner's LOS, namely $(\tilde{E}, \tilde{N})$.
2. Fast disturbances in the observatory (satellite) and imaging sensor which cannot be estimated and removed.
3. Slowly varying internal misalignments between the satellite and imaging sensor. These misalignments are not directly measurable but may be estimated and then removed according to the quality of their estimates.
4. Non-ideal satellite attitude. This attitude is dynamic and may be estimated with limited accuracy.
5. Noise in the attitude rate, R, measurements. These measurements support the satellite attitude estimate and may be provided by gyroscopes mounted in the satellite.
6. Non-ideal observatory, orbit position, $\hat{O}$. This position is measured or estimated with limited accuracy.

It will be appreciated that parallax measurements, shown in the geometries of FIGS. 6 and 7, require that scene collections by the remote imaging system be constrained and carefully timed over extended durations. This reduces, however, the amount of navigable scenes that may be captured. Scene acquisition must accommodate the parallax measurements in one area, when another area may have more important scientific content. Thus, when parallax measurements are necessary, the remote imaging system includes increased complexity and reduced efficiency.

Other inefficiencies and increased complexities are due to the use of an orbit ranging measurement system, as shown by orbit ranging system 32 in FIG. 3. The orbit ranging measurement system requires two ground stations communicating to each other for shorter filter convergence times. This is a significant dependency. Since the present invention does not require an orbit ranging system, the remote imaging system's implementation is less complex as the number of communicating entities is reduced.

In addition, the processing system shown in FIG. 3 provides degraded performance during parallax measurements. While performing a single parallax measurement, the environmental conditions may change between collections of a particular ellipsoid point P. For example, the daily cycle of solar heating alters system misalignments significantly for missions in a geostationary orbit. Similar shifts in misalignment conditions may happen for other reasons that are difficult to discover. For example, the misalignment conditions may be a function of instrument and detector LOS whose form is only partially known.

Furthermore, the processing system shown in FIG. 3 provides its highest accuracy only when both stars and landmarks are observed. The times or locations in which an imaging sensor can view stars are often limited. This degrades or prevents the measurement of LOS attitude $\hat{A}$. Measurement noise in the scanning angle telemetry also degrades the estimate of LOS attitude $\hat{A}$.

The aforementioned geo-location solutions do not apply equally well over the entire field-of-regard (FOR). Generally, a solution is most accurate at the time and place where it is obtained. Scenes with the most accurate geo-location are usually those whose content contributed to the solution. Scenes without such content are geo-located with less accuracy, or not at all. This reduces the amount of the navigable scene.

In addition, the geo-location solutions require a predetermined initial orbit accuracy, in order to initialize the Kalman filter and converge the Kalman filter to good image quality. After orbital maneuvers and with only a single ground processing station, convergence time of the Kalman filter is least 12 hours.

Due to the inefficiencies and complexities described above, a preferred method of the present invention will now be described by reference to FIGS. 8, 9 and 10.

The present invention provides a method referred to as introspective landmarking with balanced estimation (ISLAND with BALEST). The ISLAND with BALEST is a method for geo-locating Earth scene samples (image pixels), which are acquired from a planetary orbit, with approximately a constant accuracy over the entire field-of-regard, at all scan angles, e.g. the full Earth's disk at a geostationary orbit. The present invention obtains this constant accuracy in real-time, through estimation of intrinsic system states and only requires landmark measurements. A method of the present invention processes these landmark measurements sequentially and recursively using a Kalman filter.

It will be understood that, advantageously, the estimated intrinsic system states apply equally well to all lines-of-sight (LOS). Scenes that do not contain landmarks may, nevertheless, be navigated with the same accuracy as scenes that do contain landmarks. The presence of a landmark in a scene is only incidental to the navigation accuracy of that scene.

The preferred embodiment of the present invention bypasses the need for orbit telemetry by including an estimate of the deviation from an ideal orbit (or nominal orbit) in the Kalman filter state vector.

The preferred embodiment of the present invention bypasses any need for using noisy scan telemetry, by replacing such telemetry with nominal parameters for the expected landmark location(s).

More specifically, ISLAND with BALEST of the present invention uses mathematical forms that represent LOS motion on the Earth due to variations of orbit and attitude of the satellite and imaging sensor. The mathematical forms intentionally depend on each other. The errors in these mathematical forms largely cancel each other in pairs, hence the reference herein to balanced estimation (BALEST).

The method of ISLAND with BALEST assumes pixels are acquired with an extended FOV, as shown in FIG. 1, when using the remote imaging system in an orbit around a planetary body, as shown in FIG. 2. More specifically, a method of ISLAND with BALEST uses the front-end ground processing system, designated as 80 in FIG. 8. The method of the present invention uses the same output signals from the space segment shown in FIG. 3. There are a few differences, however, between the system of the present invention shown in FIG. 8 compared to the system shown in FIG. 3. The primary differences at this level are:

1. ISLAND with BALEST (or ISLAND) obtains its orbit knowledge from elements of a Kalman filter state vector, instead of from a separate orbit determination system.

2. ISLAND uses nominal landmark coordinates in its Kalman filter, instead of measured landmark coordinates in its Kalman filter.

3. ISLAND does not require attitude knowledge from star measurements in order to separate attitude and orbit information in its landmark measurements. As shown in FIG. 8, ISLAND performs landmark processing 82 using received pixel values 83.

4. ISLAND, however, may use star measurements independently of landmark measurements in order to refine attitude knowledge. Thus, star processing 81 is optional in the present invention.

ISLAND of the present invention, advantageously, includes balanced estimation. As shown in FIG. 8, the expected estimation errors in attitude vectors and orbit vectors are anti-correlated. These expected errors oppose each other and substantially cancel. In addition, sequential landmark processing, together with a nominal orbit estimate for each landmark update creates a loosely coupled system with a small footprint on an operational scanning timeline. The loosely coupled system is generally more reliable and flexible. Furthermore, since use of stars are not required, algorithmic and calibration complexities are eliminated. This results in more time for scene acquisition. Moreover, since stars are not required, a number of possible bad measurements due to calibration errors, or uncertainties are eliminated.

Each landmark used by the present invention contributes information to the system state estimate immediately. The information extracted from each landmark measurement does not require a temporal queue of measurements, during which time the information content of each queue entry may degrade.

Landmark measurements alone are sufficient for the present invention. Their nominal and noiseless location is a sufficient replacement for noisy scan angle telemetry in the Kalman filter estimator. This increases the accuracy of the estimation process. In addition, the system state extracted from the landmarks is global knowledge, which applies to the entire field-of-regard (FOR) when viewing a planetary body. Finally, ISLAND processing converges from no system knowledge to an accurate estimate of orbit and attitude within a few hours, without requiring a separate orbit determination system.

ISLAND uses a Kalman Filter to estimate the state of imaging systems at any instant of time from landmark measurements. The canonical system equations for a Kalman filter are presented below.

Equation (1) shows the state vector X and observation vector Z:

$$\dot{X} = f(X, \omega) + W$$

$$Z = h(X, E, N) + \epsilon \quad (1)$$

where X is the state vector, $\omega$ is the inertial angular rate vector, E and N are the imaging sensor's LOS angles, Z is the observable, W is the process noise and $\epsilon$ is the measurement noise. Both noises are assumed to be white Gaussian noise processes.

The function $f$ is the kinematic transformation of X as a function of X and the inertial rates $\omega$. As will be explained later, the present invention includes a specific form for the state vector X and the observation matrix h.

The Kalman filter performs two types of updates of the state vector and the covariance matrix. One update is a time update and the other update is a measurement update. Time updates apply at any discrete time t. Measurement updates, however, occur less frequently and at discrete times . . . $t_{k-1}$, $t_k$, $t_{k+1}$ . . . .

The time update propagates the state vector and the covariance matrix in time between measurement updates. The time update uses the kinematic transformation $f$ to integrate the state vector. The notation for the estimate of the state vector between measurement updates is $\hat{X}^-$; this is called the a priori estimate. The a priori estimate uses the state transition matrix A and the process noise matrix Q to propagate the covariance matrix P between measurement updates, as shown in Equation (2). The upper time limit $t_k$ is the time of the next measurement update.

$$P_k^- = A(t_k, t_{k-1}) P_{k-1}^+ A(t_k, t_{k-1})^T + Q(t_k, t_{k-1}) \quad (2)$$

The time update applies to any time $t_{k-1} \leq t \leq t_k$, not just to the time of the next measurement update $t = t_k$. It propagates the state vector to each pixel's collection time for accurate geo-location.

The measurement update adds new information to the a priori estimate to create the a posteriori state estimate, as shown in Equation (3):

$$\hat{X}_k^+ = \hat{X}_k^- + \Delta_k \quad (3)$$

The increment $\Delta_k$ is the measurement residual scaled by the Kalman filter gain K. The residual is the detected offset between the collected and predicted landmark neighborhood image. The offset is obtained by image processing, as shown in Equation (4):

$$\Delta_k = K_k \text{offset}(\tilde{I}, \hat{I}) \quad (4)$$

The collected image $\tilde{I}$ is the raster of pixels from the neighborhood around the landmark feature. The reference, or predicted image $\hat{I}$ is the raster of pixels projected from a reference database (or storage memory) into the imaging sensor's native reference frame.

The projection uses the following elements:

(a) the current propagated state vector estimate, in which each column of detector pixels has a unique time stamp, (b) the commanded or measured scan angles, and (c) the measured coordinates of each detector in a channel's vertical array.

The gain is shown in Equation (5):

$$K_k = P_k^- H_k^T (H_k P_k^- H_k^T + R)^{-1} \quad (5)$$

where R is the measurement covariance matrix, and H is the observation matrix (shown as h in Equation (1)).

The a posteriori covariance estimate is shown in Equation (6):

$$P_k^+ = (I - K_k H_k) P_k^- (I - K_k H_k)^T + K_k R K_k^T \quad (6)$$

Figure 8:
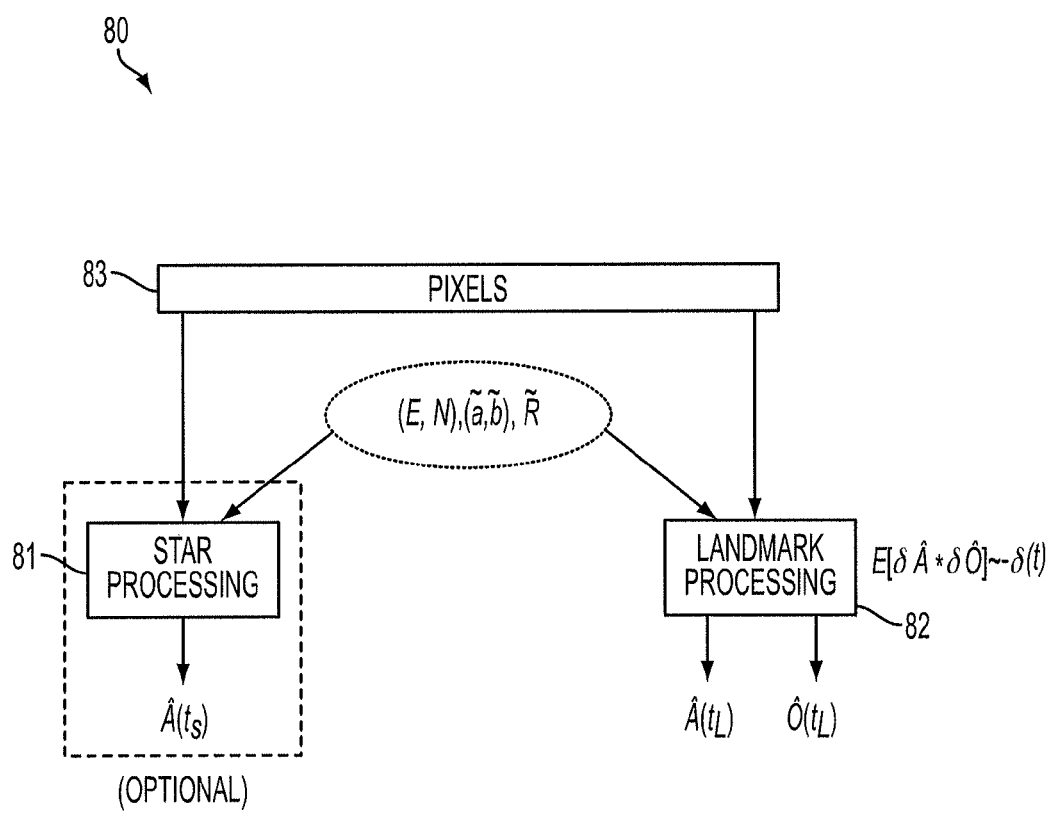
FIG. 8 is a block diagram of a portion of the ground processing segment that is similar to the portion shown in FIG. 3. The block diagram shown in FIG. 8, however, does not require star processing (star processing is optional) to obtain attitude knowledge of the imaging system and does not require orbit ranging to obtain orbit knowledge of the imaging system, in accordance with an embodiment of the present invention.
Figure 9:
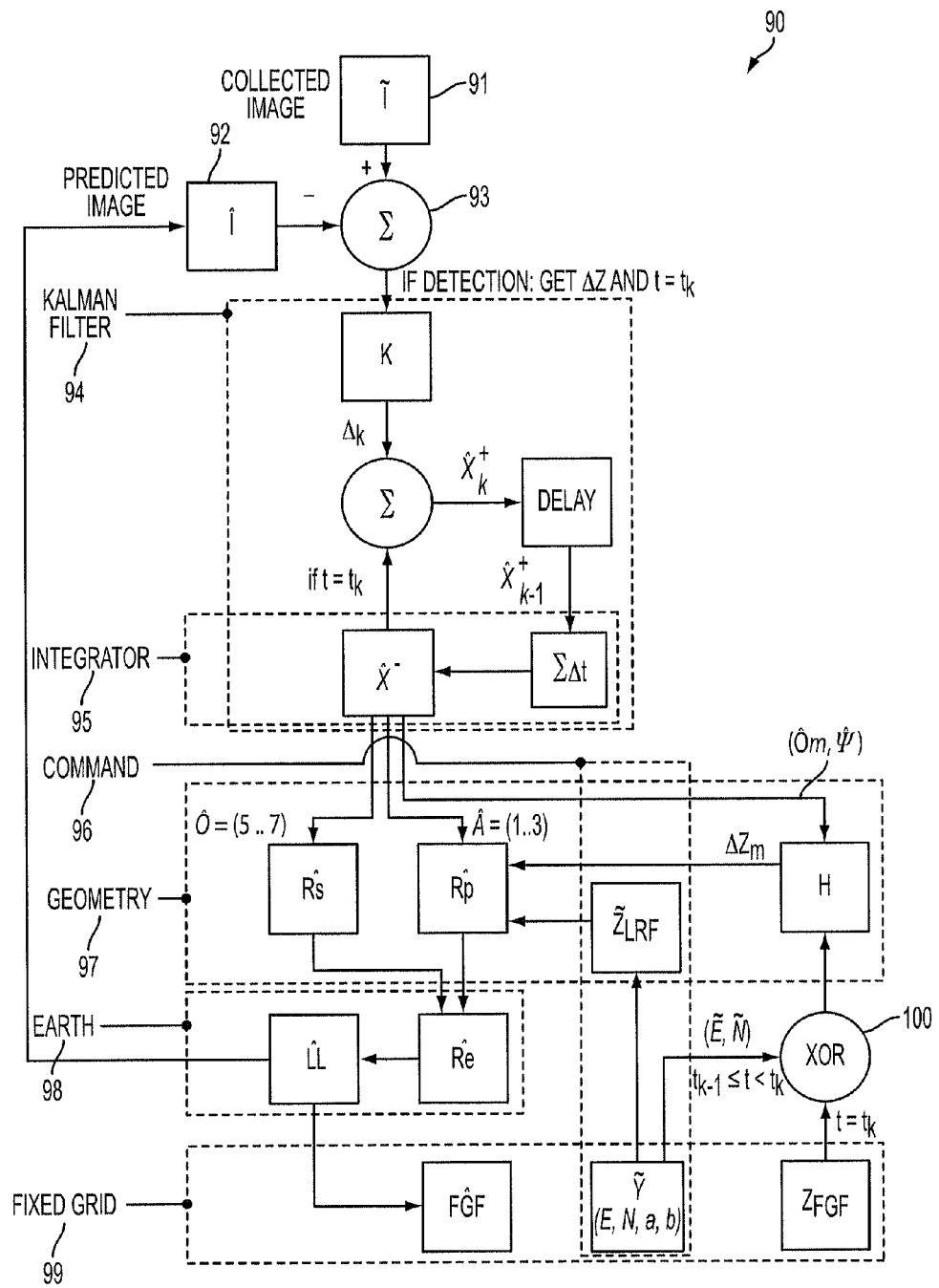
FIG. 9 is an exemplary processing system of the present invention for providing geo-located pixels in an ideal frame, referred to as a fixed grid frame (FGF). A Kalman filter processes incoming images collected by at least one imaging sensor disposed in the space segment. The Kalman filter, which includes a simplified state vector (X) and a simplified observation matrix (H), quickly converges to provide the geo-located image data, in accordance with an embodiment of the present invention. The "hats" (^) indicate estimates, not unit vectors.

The aforementioned elements of the Kalman filter and the aforementioned two updates of the Kalman filter, namely, the time update and the measurement update, are shown in FIG. 9, thus providing a more detailed view of ground processing segment 80 shown in FIG. 8.

Referring now to FIG. 9, there is shown a detailed view of a ground processing segment, generally designated as 90. Generally, the geo-located pixels are shown with the symbol $\widehat{FGF}$, which is the coordinates of a geo-located pixel in an ideal, or nominal frame, namely, a fixed grid frame, as shown in fixed grid processing module 99.

The collected and predicted landmark pixel raster images are indicated by $\tilde{I}$ and $\hat{I}$, respectively. These images are shown labeled as 91 and 92, respectively. A successful correlation between the two images, as determined by an image correlation process performed by correlation module 93, provides the offset ΔZ, shown in Equation (4), as an input to Kalman filter module 94, in which a measurement update is executed. A successful correlation implies that a landmark feature has been detected, correlated and successfully matched; this is indicated in FIG. 9 by "t=$t_k$". Thus, a measurement update is only executed, if correlation module 93 indicates that a landmark feature in collected image 91 has been detected, and successfully correlated against predicted image 92 (for example, the correlation peak exceeds a predetermined peak value).

The Kalman filter time update always runs, and applies to all available scene pixels; FIG. 9 indicates this by "$t_{k-1} \leq t < t_k$". The elements $\widehat{Rs}$, $\widehat{Rp}$ and $\widehat{Re}$, which were described with respect to FIG. 5, are part of the calculations performed by geometry module 97 and Earth module 98 for every available scene pixel. The latitude and longitude, LL, of every available scene pixel, which is represented by the geocentric vector $\widehat{Re}$, is also calculated by Earth module 98.

The geodetic latitude and longitude coordinate, LL, is converted into a fixed grid frame (FGF) coordinate by fixed grid module 99. This is used for final geo-location of Earth scene pixels. Furthermore, the geodetic LL of each pixel is provided as feedback from Earth module 98 to correlation module 93. This feedback forms predicted image 92, which is also referred to as a projected image 92.

The Kalman filter module 94, which includes the measurement update and the time update is always running. The discrete step-wise integration that implements the core of time propagation is indicated by $\Sigma^{\Delta t}$ in the Kalman filter module. The notation for the estimate of the state vector between measurement updates is shown as $\hat{X}^-$; this is called the a priori estimate. The measurement update adds new information to the a priori estimate to create the a posteriori state estimate, as shown in Equation (3). The increment $\Delta_k$ is the measurement residual ΔZ scaled by the Kalman filter gain K.

The data flow 90 shown in FIG. 9 includes eight modules (some of which have already been described) namely, collected image 91, predicted image 92, correlator 93, Kalman filter 94 which includes integrator 95, command 96, geometry 97, Earth 98, and fixed grid 99. In addition, an XOR gate 100, which receives data from the fixed grid module, provides two types of parameters to observation matrix H.

The scanning instrument of the imaging sensor (FIGS. 1 and 2) produces a collected image, designated as 91. The collected image 91 is correlated with a predicted image 92 using correlation module 93. If the correlation is successful, it produces a detection flag, or an alert. The detection flag results in an offset ΔZ and time $t_k$ sent to Kalman filter module 94.

The detection flag triggers a Kalman filter measurement update. The update takes offset ΔZ and measurement time $t_k$ as inputs. A detection flag also switches the output of XOR gate 100 to the nominal landmark location $Z_{FGF}$ in fixed grid module 99. The state vector of the Kalman filter module provides a balanced estimation of attitude (A) states and orbit (O) states. The attitude states and the orbit states are described below.

The integrator module 95 propagates system knowledge forward in time from the time of each measurement update time $t_k$ to the next measurement update time $t_{k+1}$. System knowledge is represented by the state vector X. The integrator module 95 implements the time update of the Kalman filter. It produces state vector X at the measurement times and all intermediate times required to navigate earth scene pixels. At those intermediate times (time updates), namely, $t_{k-1} \leq t < t_k$, the output of the XOR gate is switched to the measured command telemetry $\tilde{Y}$ produced by command module 96 and fixed grid module 99.

The geometry module 97 converts the current estimate of system knowledge and pointing commands to a position and LOS vector. This enables computation of the LOS intersection with the Earth, as shown in FIG. 5. The observation matrix H is also processed by geometry module 97 and is described below later.

The Earth module 98 computes the intersection point of the LOS with the earth to produce an earth-centric vector. This is computed from the orbit position and LOS vectors provided by geometry module 97. This intersection point is converted to geodetic latitude and longitude.

For measurement updates of the state vector, the geodetic coordinates are used to query reference imagery to produce predicted image 92.

The Kalman filter will now be further described.

Geolocation relies on the accurate transformation of vectors as geometrical objects between coordinate systems, also known as frames of reference. For example, the LOS vector (FIG. 5) is known in a source frame native to the scanner. This native frame is labeled the LRF (line-of-sight reference frame). Direct high-accuracy measurements provide this knowledge. The LOS vector, however, is not known in an ideal destination frame, which is called the fixed grid frame, or the FGF. In addition, the LOS vector is not known in intermediate reference frames. These intermediate reference frames are listed below, sorted from the ideal frame to the native frame:

1. FGF. Ideal fixed grid frame. Defined by system requirements.
2. ORF. Orbit reference frame. Defined by actual orbit.
3. IMF. Instrument mounting frame. Defined by spacecraft control error.
4. VIMF: Virtual instrument mounting frame. Defined by instrument attitude-like misalignments.
5. LRF: LOS reference frame of scanner's axes. Defined by instrument non-attitude-like misalignments.

The state vector used by the Kalman filter captures the parameters of required transformations between frames. The transformations require translation, rotation, and an affine operation. The transformations are between the LRF, VIMF, and FGF.

The first half of the state vector is shown below. The subscript "P" indicates principal states. The second half (shown later) contains bias states (state velocities). There is a one-to-one correspondence between the first and second halves of the state vector. Typically state vectors only include attitude states, like those shown in positions 1-4 of Equation (7A). They may also include Cartesian orbit ephemeris states. However, the inclusion of angular and radial orbit deviation states, which are in positions 5-7 of Equation (7A), are advantageous features unique to the present invention.

$$X_P = (\phi_C, \theta_C, \psi_C, o_m, \Delta R/Rs0, \Delta\lambda, Ls) \quad (7A)$$

In Equation (7A), roll, pitch, and yaw ($\phi_C$, $\theta_C$, $\psi_C$) represent the combined attitude of sensor and spacecraft with respect to an ideal fixed grid reference frame (FGF). The attitude is between a virtual orthogonal frame internal to the sensor (VIMF) and FGF frames. The virtual frame represents all internal misalignments of the imaging system that combine into an effective roll, pitch, and yaw. Their effect is degenerate with the external attitude of the spacecraft platform and, thus, is not observable as separate states. Hence the combined subscript (c) notation in the first three attitude angles of the state vector.

The H matrix, which is defined in Equation (8), includes (E, N) as the scan angles, r as an ideal earth curvature, and $\hat{\psi}$ as the current yaw estimate. The ideal earth curvature, which is described below, is a function of the above scan angles.

$$H = \begin{pmatrix} & \text{Col. 1:} & \text{Col. 2:} & \text{Col. 3:} & \text{Col. 4:} & \text{Col. 5:} & \text{Col. 6:} & \text{Col. 7:} & \ldots & \text{Col. 8-14:} \\ EW: & 0 & -\cos N & -\sin N & \ldots & 0 & -r\sin E \cos N & -r(-\sin N \sin E - \hat{\psi}) & -r\cos E & \ldots & 0 \\ NS: & -1 & -\sin N \tan E & \cos N \tan E & \ldots & -\tan E & -r\sin N / \cos E & -r\cos N / \cos E & -r\hat{\psi} & \ldots & 0 \end{pmatrix} \quad (8)$$

Orthogonality ($O_m$), which is the fourth state, represents a deviation from perpendicular of the scan axes' frame (LRF). This state parameterizes the non-orthogonal LRF frame and its mapping to the VIMF.

The attitude states together with the orthogonality state enable a mapping of a tuple (E, N, a, b) to the LOS vector $\widehat{Rp}$ in the ECF. The tuple represents controlled degrees of freedom of the sensor, in which (E, N) are optical scan angles and (a, b) are detector coordinates relative to the scan angles, as shown in FIG. 1.

The last three primary states of the state vector, shown in Equation (7A), are known as Kamel parameters ($\Delta R/Rs0$, $\Delta\lambda$, Ls) which represent the orbit's deviation from a nominal orbit, for example, an ideal geostationary orbit. These states do not directly represent LOS motion, but define a radial and angular adjustment to an ideal orbit vector to produce an estimate of an actual orbit vector estimate, namely, $\widehat{Rs}$ (see FIG. 5).

It will be understood, however, that while an exemplary embodiment of the present invention uses Kamel parameters, as shown in Equation (7A), to characterize the orbit state, the present invention also contemplates using any other parameter set which could describe the orbit deviations of the imaging sensor, e.g. Kepler parameters.

For the sake of completeness, Equation (7B) shows the second half of the state vector, which contains bias states (designated as B, or b in Equation (7B).

$$X_P = (b_{\phi c}, b_{\theta c}, b_{\phi c}, b_{O_m}, b_{\Delta R/Rs0}, b_{\Delta\lambda}, b_{Ls}) \quad (7B)$$

The sum of the estimated ECF LOS $\widehat{Rp}$ and the estimated orbit vector $\widehat{Rs}$ intersect at point "P" on the ellipsoid of the planetary body. This geo-locates an individual detector pixel at the point "P", as shown in FIG. 5.

Having defined an exemplary state vector of the present invention, an observation matrix (H) of the present invention will be described next.

The Kalman filter observation matrix (H) is a linear map from the states which are not observable to LOS motion which is observable. The H matrix is parameterized by scan angles, an ideal earth curvature for given scan angles, and current estimate of primary yaw, as shown in Equation (8).

The scan angles E and N are the nominal FGF coordinates of a predetermined, selected landmark. The scan angles, however, are not the measured scan angles at the observation time of the landmark. Using the nominal FGF coordinates (also referred to herein as a predetermined landmark) is a unique feature of the present invention, because it eliminates a noise factor from the Kalman estimation process.

The current estimate of primary yaw in the state vector is the a priori estimate as provided by the Kalman filter time update. It is the third element of the state vector integrated with the spacecraft rates from the last measurement update of the Kalman filter.

The full H matrix is used to compute the Kalman gain matrix K, as shown in Equation (5).

Referring next to the earth curvature factor, it is a ratio of the orbit range to the LOS slant range, as defined below in Equation (9):

$$r = Rs/Rp \quad (9)$$

The ratio is characteristic of the instrument's perspective of the Earth's spherical (convex) surface. As shown in FIG. 5, the Rs vector is the ideal orbit radius. The slant range vector Rp is derived from a pair of scan angles Z=(E, N), which assumes an ideal spacecraft attitude and no instrument misalignments. The scan angles are assumed to be fixed grid angles with Cartesian components $S_{FGF}=(Sx, Sy, Sz)$. This may be expressed in the ECF, as $S_{ECF}=(-Sz, Sx, -Sy)$.

The notation for the slant range vector in ideal conditions is Rp0. The solution of the slant range is more convenient, however, if the geometry is scaled by the axes of the ellipsoid components. This produces a unit spherical space. The notation for the ideal slant range in spherical space is Rp01 is shown in FIG. 10.

Using the Law of Cosines provides Equation (10) below:

$$Rp01 = Rsp01 - \sqrt{Rsp01^2 - Rs01^2 + 1} \quad (10)$$

where
Rs01=Rs0/Re0,

Rsp01=$\vec{Rs01} \cdot \widehat{Rp01}$, and $\vec{Rs01}$=(Rs01,0,0).

Figure 10:
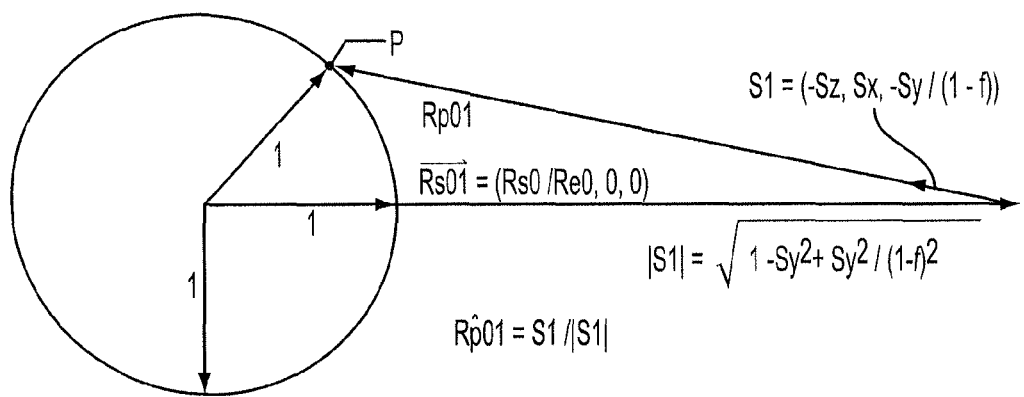
FIG. 10 shows an ideal earth curvature geometry, in which all vectors are scaled to a unit sphere and "f" is the earth flattening factor.

The definition of $\widehat{Rp01}$ and related quantities are shown in FIG. 10. It will be understood that the notation 'S' for the scanned LOS, $S_{ECF}$, acquires suffix '1' like the other vectors.

The Rsp01, which is a projection of the LOS unit vector onto the ideal orbit vector, simplifies to Rs0$^\Sigma$/(re0|S1|t). This completes the definitions of all the quantities needed to compute the slant range from Equation (9), as Rp=Re0 Rp01.

It will be understood that the present invention may interleave star measurements with landmark measurements in order to further refine the first four states of the state vector. In such case, the ideal earth curvature parameter r in observation matrix H becomes zero, since the slant range of stars is effectively infinity, i.e. r=Rs/Rp=Rs/00=0. The Kalman filter measurement update then simplifies further and only registers contributions from the first four states of the state vector, namely ($\emptyset_c$, $\theta_c$, $\phi_c$, $O_m$).

The transition matrix $\Delta$ and the process noise matrix Q, shown in is Equation (2), are now detailed below in Equations (11) and (12):

$$A = I(14 \times 14) + F(14 \times 14)\Delta t \quad (11)$$

where I is the N×N identity matrix, $$F = \begin{pmatrix} \Omega & 0(3 \times 4) & -I(7 \times 7) \\ 0(4 \times 3) & 0(4 \times 4) & \\ 0(7 \times 7) & & 0(7 \times 7) \end{pmatrix}$$

$$\Omega = \omega_e \begin{pmatrix} 0 & 0 & 1 \\ 0 & 0 & 0 \\ -1 & 0 & 0 \end{pmatrix}$$

and $\omega_e$ is the sidereal rotation rate of the earth.

$$Q = \begin{bmatrix} M1 & -(\Delta t^2/2)M2 \\ -(\Delta t^2/2)M2 & \Delta t M2 \end{bmatrix} \quad (12)$$

where
M1=M($\Sigma_r, \Sigma_m$)
M2=M($\Sigma_{Lr}, \Sigma_{Lm}$)
and $$M(r,m) = \begin{bmatrix} rI(3 \times 3) & 0(3 \times 4) \\ 0(4 \times 3) & 0(4 \times 4) \end{bmatrix} + mI(7 \times 7)$$

I is the N×N identity matrix and
$\Delta t$ is the time between measurement updates of the Kalman filter.
$\Sigma_r$ is the predicted variance of the total drift of the spacecraft angular rate measurements over $\Delta t$
$\Sigma_m$ is the predicted variance of the total error of the system model over $\Delta t$
$\Sigma_{Lr}$ is the coefficient of the long-term component of $\Sigma_r$
$\Sigma_{Lm}$ is the coefficient of the long-term component of $\Sigma_m$
The measurement covariance matrix R, shown in Equation (5), is now detailed below in Equation (13):

$$R = \begin{bmatrix} \sum_{sw} & 0 \\ 0 & \sum_{ns} \end{bmatrix} \quad (13)$$

where $\Sigma_{\theta w}$ and $\Sigma_{ns}$ are the variances of the measurement noise in the East-West and North-South directions.

It will be appreciated that the location of remotely sensed image pixels on any central body ellipsoid applies to any geostationary orbit. This includes missions where external orbit determination is not available, or has inadequate accuracy, or is difficult to obtain. It may, however, also apply to missions in non-geostationary orbits.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method of geodetically locating pixels of a captured image of a planetary body, the method comprising the steps of:
   detecting an object on the planetary body using an imaging sensor viewing the planetary body;
   matching the object to a predetermined landmark on the planetary body;
   updating, at a time $t_k$, a state vector representing kinematics of the imaging sensor, and $t_k$ representing a present update time,
   wherein updating the state vector at the present time occurs if, and only if, the matching step is successful;
   computing a line-of-sight (LOS) vector from the imaging sensor to the planetary body, based on observations of the planetary body and the kinematics of the state vector; and
   geodetically locating the pixels of the captured image, based on the LOS vector;
   wherein the LOS vector is based only on (a) the predetermined landmark and (b) a position command from a ground processing segment to the imaging sensor.

2. The method of claim 1 wherein detecting and matching the object to the predetermined landmark includes
   collecting an image from the imaging sensor of the detected object,
   predicting an image of the detected object, and
   correlating the collected image with the predicted image.

3. The method of claim 2 wherein correlating includes
   finding a peak value resulting from correlating the collected image with the predicted image,
   determining if the peak value is above a predetermined threshold value, and
   flagging the matching step as successful, if the peak value is above the predetermined threshold value.

4. The method of claim 2 wherein updating the state vector includes
   determining an offset vector between the collected image and the predicted image,
   multiplying the offset vector by a Kalman gain, at the present update time, to obtain a state increment, and
   updating the state vector using the state increment.

5. The method of claim 1 wherein the state vector includes the following parameters:
   attitude parameters of the imaging sensor,
   orthogonality of the imaging sensor, and
   orbit parameters of the imaging sensor.

6. The method of claim 5 wherein
   the attitude parameters include roll, pitch and yaw, representing a combined attitude of an orbiting platform and the imaging sensor disposed in the platform, and
   the attitude parameters are in a fixed grid reference frame (FGF).

7. The method of claim 5 wherein
   the orbit parameters include Kamel parameters representing an orbit's deviation from the nominal orbit.

8. The method of claim 5 wherein
   the orbit parameters include Kepler parameters describing an orbit's deviation from the nominal orbit.

9. The method of claim 5 wherein
   the attitude and orthogonality parameters are used to compute the LOS vector to a pixel in the captured image, and
   the orbit parameters are used to compute an orbit vector from the imaging sensor to a center of the planetary body.

10. The method of claim 9 wherein
    the LOS vector and the orbit vector are used to compute a geodetic location of each of the pixels in the captured image, the geodetic location provided in latitude and longitude of the planetary body.

11. The method of claim 1 wherein
    the state vector is a state vector used in a Kalman filter, and predicted observations of the planetary body are provided by an observation matrix used in the Kalman filter, and
the observation matrix is parameterized by scanning angles of the imaging sensor, and a current estimate of yaw in the state vector.

12. The method of claim 11 wherein
the observation matrix is further parameterized by an ideal curvature of the planetary body.

13. The method of claim 11 wherein the scanning angles are based on nominal FGF coordinates of the predetermined landmark, during the time $t_k$, and
a measured LOS in a line-of-sight reference frame (LRF), during a time greater than or equal to $t_{k-1}$ and less than $t_k$, wherein $t_{k-1}$ is a time of a previous state vector update, based on a successful match.

14. A method of assigning geodetic locations to pixels in an image taken by an imaging sensor of a planetary body, the method comprising the steps of:
receiving a collected image including pixels in a neighborhood of an observed feature;
forming a predicted image including pixels in a neighborhood of a predetermined landmark;
flagging the collected image as likely including the predetermined landmark;
calculating an offset between the predicted and collected images, at a present time of $t=t_k$;
updating a state vector representing kinematics of the imaging sensor, based on the offset; and
assigning a geodetic location to a pixel captured by the imaging sensor, using a geodetic location of the predetermined landmark, at the present time of $t=t_k$.

15. The method of claim 14 wherein
assigning a geodetic location to a pixel captured by the imaging sensor includes using an observed location based on a scanning angle of the imaging sensor, at a previous time of t greater than or equal to $t_{k-1}$ and less than $t_k$, where $t_{k-1}$ is a previous time of updating the state vector.

16. The method of claim 15 wherein
the scanning angle of the imaging sensor is based on telemetry data from a ground station.

17. The method of claim 15 including the steps of:
performing star measurements to obtain another scanning angle of the imaging sensor, and
assigning a geodetic location to a pixel captured by the imaging sensor includes using the other scanning angle based on the star measurements.

18. The method of claim 15 wherein
the geodetic location of the pixel is assigned using only (a) the observed location and (b) the predetermined landmark, and
the geodetic location of the pixel is not assigned using star measurements.

* * * * *